(12) United States Patent
Baker et al.

(10) Patent No.: US 7,522,767 B2
(45) Date of Patent: Apr. 21, 2009

(54) TRUE COLOR COMMUNICATION

(75) Inventors: Harlyn Baker, Los Altos, CA (US);
Nina Bhatti, Mountain View, CA (US);
Sabine Susstrunk, Lausanne (CH);
Michael Harville, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 701 days.

(21) Appl. No.: 11/233,600

(22) Filed: Sep. 9, 2005

(65) Prior Publication Data
US 2007/0058859 A1    Mar. 15, 2007

(51) Int. Cl.
*G06K 9/00* (2006.01)
(52) U.S. Cl. .................................. 382/167; 382/162
(58) Field of Classification Search ................ 382/167, 382/162; 345/601; 358/2.1, 1.18, 1.9; 715/961, 715/974
See application file for complete search history.

(56) References Cited

U.S. PATENT DOCUMENTS

| | | | |
|---|---|---|---|
| 5,254,978 A * | 10/1993 | Beretta | 345/601 |
| 6,038,339 A | 3/2000 | Hubel et al. | |
| 7,209,262 B2 * | 4/2007 | Komatsu | 358/2.1 |
| 2002/0141639 A1 | 10/2002 | Steinberg | |
| 2002/0150290 A1 | 10/2002 | Robins et al. | |

OTHER PUBLICATIONS

Database Compendex (Online) Engineering Info., Inc., NY, NY, US. Harville, et al., Consistant image-based measurement and Classification of Skin Color IEEE Proc 2005.

* cited by examiner

*Primary Examiner*—Anh Hong Do

(57) ABSTRACT

Embodiments of the present invention recite a system and method for conveying the true color of a subject. In one embodiment, the present invention comprises an image capture device, an imaged reference color set comprising at least one reference color, and a control reference color set comprising at least one control color corresponding to the at least one reference color. The present invention further comprises a color correction component for accessing the control reference color set and the imaged reference color set and for generating a color correction function which eliminates a discrepancy between the at least one reference color and the at least one control color.

30 Claims, 7 Drawing Sheets

TRUE COLOR COMMUNICATION

TECHNICAL FIELD

Embodiments of the present invention are related to accurately capturing and conveying the color of a subject.

BACKGROUND

In the field of image capture and reproduction, processing parameters of the image capture and image display devices are pre-set by the manufacturers. Typically, the manufacturers adjust these parameters so that the created image looks "good" so that the user will be satisfied with the result. This is referred to as the "photofinishing or preferred reproduction model" as opposed to the "colorimetric reproduction model" which seeks to convey the correct colors of a subject. For example, many digital cameras perform an operation called "white balancing" that adjusts the imaging parameters so that the overall average color of an image is, for example, that of a half-brightness gray image (50% gray). This assumes that the view imaged is in fact 50% gray, which is rarely true. Thus, white balancing is an arbitrary adjustment that works qualitatively to produce a viewable image, but not quantitatively to produce a correctly depicted image.

In an exemplary white balancing process, the darkest and lightest depicted values (e.g., black and white levels) in an image are usually clipped by an analysis of the distribution of brightness levels observed. The clipping is done to ensure good use of the available signal range. A pre-specified percentage of, for example, dark and light values are clipped and mapped to the same value (e.g., to zero or a maximum value). Values in between are then scaled through the available range. However, this scaling may distort the true color spectra in order to make the resulting image more appealing. These adjustments are usually pre-defined by the manufacturer and applied uniformly to all of the acquired images. Thus, the processing parameters of the digital camera do not address rendering the "true" color of the items in the view, since this cannot be determined without other information.

Additionally, the ambient lighting conditions present when an image is captured can distort the overall coloration of an image. For example, if a picture is taken indoors, the light radiated by lighting fixtures may be weighted in a particular range of the color spectrum. For example, fluorescent lighting emits light with a slightly bluish tint. Thus, a picture taken in the presence of fluorescent lighting will be distorted by the ambient light and will depict the subject with more blue tones than may actually be present.

To overcome these distortions, a controlled environment may be provided in which the image processing parameters of the image capture equipment is carefully calibrated and monitored. These controlled environments also rely upon carefully calibrated and controlled lighting so that any distortions generated by the ambient lighting and image processing equipment are either known, or minimized.

In addition to the problem of capturing an image that is photometrically correct, displaying the image without introducing distortion of the color space is also a problem. For example, the color reproduction of a computer monitor, or other display device, changes over time. As a result, there may be some "drift" of the displayed color values over time from the pre-set calibration parameters. In applications in which it is important that color rendering must remain consistent (e.g., computer animation) it is necessary to perform a detailed analysis and re-calibration of the computer monitors occasionally. Similarly, printers are calibrated before sale, but online calibration is usually limited to on/off testing of nozzle function. Scanners can be used to calibrate, or re-calibrate, colors, but these combine possible inaccuracies from both the printing and scanning of an image.

DISCLOSURE OF THE INVENTION

Embodiments of the present invention recite a system and method for conveying the true color of a subject. In one embodiment, the present invention comprises an image capture device, an imaged reference color set comprising at least one reference color, and a control reference color set comprising at least one control color corresponding to the at least one reference color. The present invention further comprises a color correction component for accessing the control reference color set and the imaged reference color set and for generating a color correction function which eliminates a discrepancy between the at least one reference color and the at least one control color.

BRIEF DESCRIPTION OF THE DRAWINGS

The accompanying drawings, which are incorporated in and form a part of this specification, illustrate embodiments of the present invention and, together with the description, serve to explain the principles of the invention. Unless specifically noted, the drawings referred to in this description should be understood as not being drawn to scale.

MODES FOR CARRYING OUT THE INVENTION

Reference will now be made in detail to embodiments of the present invention, examples of which are illustrated in the accompanying drawings. While the present invention will be described in conjunction with the following embodiments, it will be understood that they are not intended to limit the present invention to these embodiments alone. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing," "generating," "applying," "coupling," "using," "identifying," "storing," "generating," "capturing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
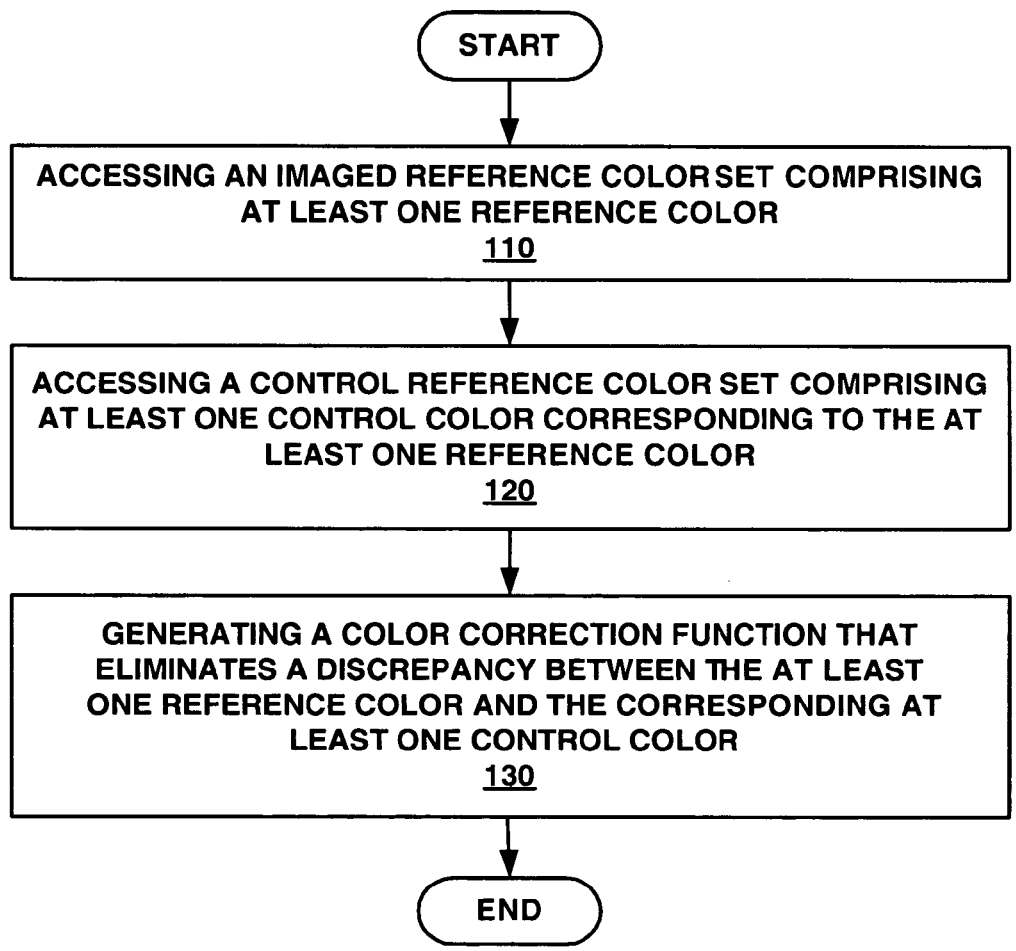
FIG. 1 is a flowchart of a method for conveying the true color of a subject in accordance with embodiments of the present invention.

FIG. 1 is a flowchart of a method 100 for conveying the true color of a subject in accordance with embodiments of the present invention. In step 110 of FIG. 1, an imaged reference color set comprising at least one reference color is accessed. In embodiments of the present invention, an image is captured which comprises a set of reference colors. The imaged reference color set may be the only object in the captured image, or may also be in a captured image of a subject. In embodiments of the present invention, the subject may be any person, place, or thing whose image can be captured.

Typically, the quality and spectral characteristics of light falling on a given subject affect the subject's appearance to a camera and thus on the image generated by the camera. The camera itself, through physical characteristics of its design and fabrication of its sensor, and also through internal processing characteristics of the camera, introduces further alteration in the perceived coloration of the subject. These effects combine to make coloration metrics of the imaged subject highly dubious. By viewing a set of reference colors captured in essentially the same ambient lighting conditions and processing parameters as the image of the subject, embodiments of the present invention may facilitate determining a transformation from the observed color space of the captured image to a reference or "true" color space that is independent of the ambient lighting conditions and image processing capabilities of the camera which captures the image.

In step 120 of FIG. 1, a control reference color set comprising at least one control color corresponding to the at least one reference color is accessed. In embodiments of the present invention, the true color space is represented by a control reference color set comprising a color or colors that correspond with the color or colors of the imaged reference color set. It is appreciated that the control reference color set may comprise a logical reference color set in which the spectral reflectance and color signal values of reference color set in the captured image are accessed, rather than an actual physical entity.

In step 130 of FIG. 1, a color correction function is generated which eliminates a discrepancy between the at least one reference color and the corresponding control color. By comparing the characteristics of the control reference color set with the characteristics of the imaged reference color set captured in the image, embodiments of the present invention can determine a transformation, or "color correction function," which accounts for the discrepancy between the characteristics of the imaged reference color set and the control reference color set. This color correction function directly compensates for the combined effect of the ambient lighting in the room and the color transformation of the acquiring camera.

To facilitate determining this reference transformation, embodiments of the present invention detect the imaged reference color set within the image and measure the observed characteristics of the imaged reference color set. Embodiments of the present invention then determine a color correction function that brings color descriptions of the imaged reference color set closer to the color values of control reference color set. This color correction function can then be applied to the captured image, or subsequently captured images so that the colors in the images more accurately convey the true colors of a subject.

Thus, embodiments of the present invention can infer the combined effects of the ambient lighting conditions at the location at which the image is captured as well as device characteristics and the image processing capabilities of the image capture system. These combined effects are then substantially eliminated from the image such that a more accurate representation of the color of the subject can be conveyed. In embodiments of the present invention, the color correction function may be generated and applied by the image capture device itself, by a device displaying an image, as a service by a third party, or any combination thereof.

Figure 2A:
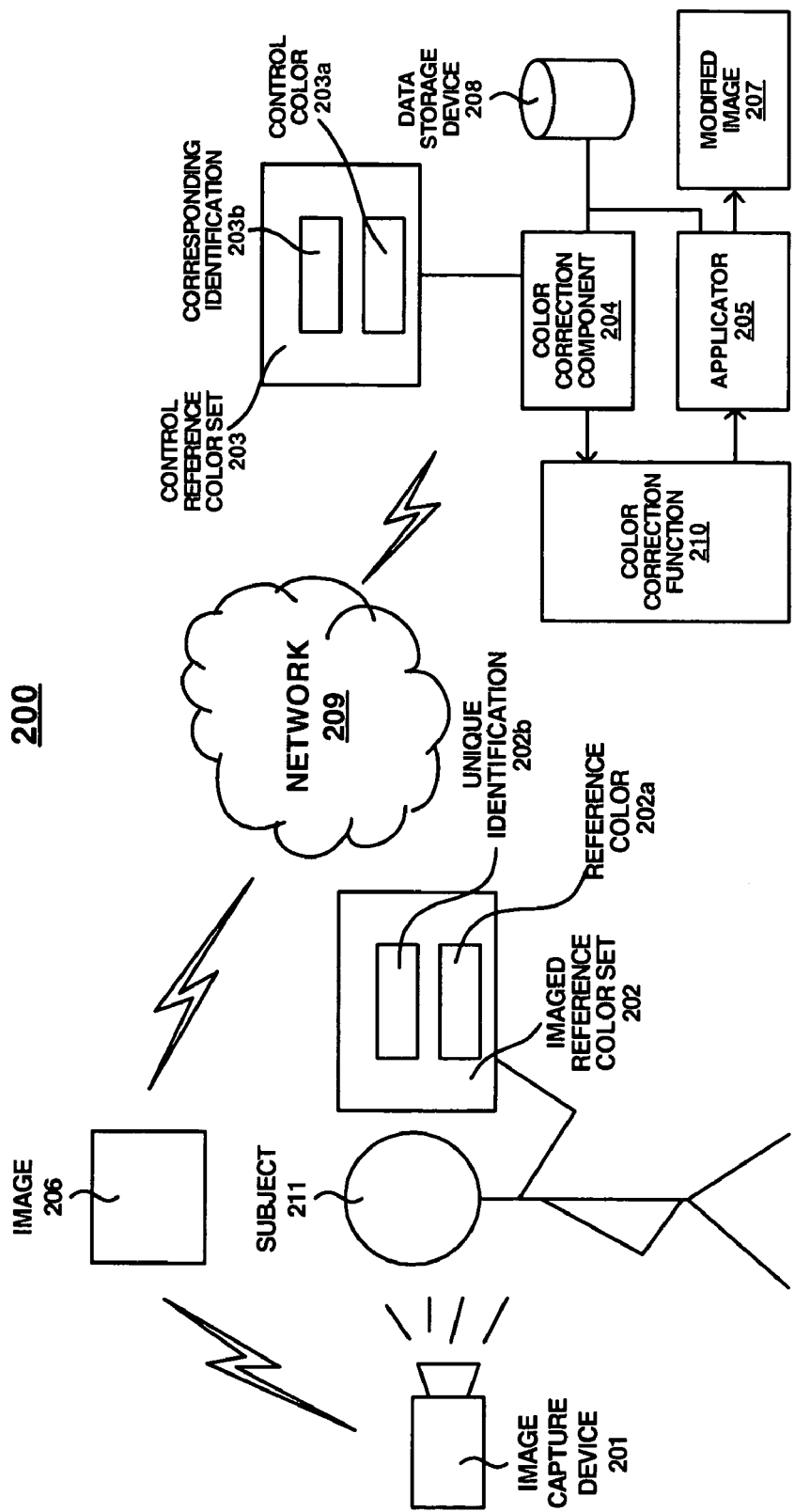
FIGS. 2A, 2B, and 2C shows exemplary image capture systems used in accordance with embodiments of the present invention.

FIG. 2A shows an exemplary image capture system 200 used in conjunction with embodiments of the present invention. In embodiments of the present invention, system 200 comprises an image capture device 201, an imaged reference color set 202, a control reference color set 203, and a color correction component 204. In embodiments of FIG. 2A, imaged reference color set 202 further comprises at least one reference color 202a and a unique identification 202b. Furthermore, control reference color set 203 further comprises at least one control color 203a that corresponds with the at least one reference color 202a as well as a corresponding identification 203b that corresponds with unique identification 202b.

In embodiments of the present invention, color correction component 204 is for accessing imaged reference color set 202 and control reference color set 203. More specifically, color correction component 204 compares reference color 202a with control color 203a to determine how the colors of imaged reference color set 202 have been transformed due to the ambient lighting conditions and the image processing parameters of image capture device 201. Color correction component 204 then generates a color correction function (e.g., 210) which eliminates the discrepancy between reference color 202a and control color 203a, if any exists.

In embodiments of the present invention, system 200 further comprises an applicator 205 which is coupled with color correction component 204. In embodiments of the present invention, applicator 205 applies the color correction function 210 generated by color correction component 204 to an image (e.g., 206) to create a modified image 207. In so doing, the combined effects of the ambient lighting conditions at the location at which image 206 is captured as well as device characteristics and the image processing capabilities of image capture device 201 are eliminated from modified image 207. As a result, the true colors of a subject (e.g., 211) are conveyed in modified image 207. It is noted that for the purposes of the present invention, the term "eliminated" means that the difference between a reference color in imaged reference color set 202 (e.g., in modified image 207) and control reference color set 203 is either outside the detection parameters of system 200 or within an accepted variation value.

As described above, in embodiments of the present invention, imaged reference color set 202 may be captured in the same image 206 as subject 211. In another embodiment, imaged reference color set 202 may be captured in a separate image than the image 206 in which subject 211 is captured. This may be advantageous in situations in which it may not be desired to show imaged reference color set 202 in the same image as subject 211. For example, in a studio photography session, the photographer may not want imaged reference color set 202 to be seen in a portrait of subject 211. Thus, the photographer may capture a first image of imaged reference color set 202 which is used in determining color correction function 210. Subsequently captured images of subject 211 are then processed using the color correction function 210 previously generated by color correction component 204. In one embodiment, system 200 further comprises a data storage device 208 for storing color correction function 210 and one or more images (e.g., image 206, modified image 207, etc.). It is noted that in embodiments of the present invention, the ambient lighting conditions and image processing capabilities which capture the separate images should be substantially the same in order to derive an accurate color correction function 210.

It is noted that the configuration of system 200 in FIG. 2A is exemplary and that other configurations of the components are possible in accordance with embodiments of the present invention. For example, color correction component 204, applicator 205, and data storage device 208 may be implemented as a discrete color correction system, or as a network of communicatively coupled components. In embodiments of the present invention, functions of color correction component 204, applicator 205, and data storage device 208 may be performed as a service by a third party service provider, or the provider of network 209. Alternatively, color correction component 204, applicator 205, and data storage device 208 may be implemented as components of image capture device 201. In another embodiment, applicator 205 is disposed upon image capture device 201 which is communicatively coupled with color correction component 204 and data storage device 208. Thus, image capture device 201 receives color correction function 210 via network 209 and applies it to image 207 to create modified image 207. In another embodiment, color correction component 204, applicator 205, and control reference color set 203 may be implemented as a removable component (e.g., of image capture device 201) using removable media such as a smart card or other removable data storage device.

In embodiments of the present invention, image capture device 201 does not require a controlled infrastructure when capturing image 206. For example, image capture device 201 may be a subject's personal computer system, digital camera, or a cellular telephone capable of generating photographs (e.g., referred to herein as a "picture phone"). Thus, rather than relying upon calibrated equipment (e.g., calibrated cameras and calibrated lighting), embodiments of the present invention may utilize the subject's personal equipment to capture image 206. Furthermore, there is no requirement for image 206 to be captured in an environment in which the ambient lighting conditions are known or controlled as long as the lighting conditions are sufficient for color correction component 204 to process the image. As a result, image 206 may even be captured in a variety of environments including, for example, outdoors, or in the home of subject 211.

Embodiments of the present invention are advantageous in that they do not require a controlled infrastructure because color correction component 204 utilizes the received image of imaged reference color set 202 to infer the ambient lighting conditions and image processing parameters of image capture device 201. For example, color correction component 204 may compare color descriptions of colors comprising imaged reference color set 202 with color descriptions of corresponding colors from control reference color set 208. As a result, embodiments of the present invention do not rely upon calibrated cameras or calibrated lighting when capturing an image of subject 211. By performing this analysis, color correction component 204 can infer the combined effects of the ambient lighting conditions of the location at which subject 211 is located and the image processing capabilities of image capture device 201. Color correction component 204 can then determine what adjustments are necessary so that the received spectral reflectance and color signal values of imaged reference color set 202 correspond with the known spectral reflectance and color signal values of the control reference color set 203. Color correction component 204 can thus compensate for distortions of the image induced by ambient lighting conditions and the image processing parameters of image capture device 201 when capturing the image and, based on this analysis, infer the correct colors for depicting subject 211. While the present invention recites that a controlled infrastructure is not required, embodiments of the present invention may be used in conjunction with a controlled infrastructure as well.

In embodiments of the present invention, image capture device 201 may comprise personal property of subject 211 such as a printer, scanner, picture phone, a digital camera, a personal digital assistant (PDA), a personal computer system, a digital video recorder, or a similar device capable of capturing an image. However, embodiments of the present invention may also be used in proprietary systems in which a manufacturer provides a kiosk or other automated system for providing product consultation.

In embodiments of the present invention, network 209 comprises a dial-up Internet connection, a public switched telephone network (PSTN), a high-speed network connection (e.g., cable Internet, or high-speed computer network), or the like. Alternatively, image capture device 201 may utilize a cellular telephone connection, a satellite telephone connection, a radio connection, an infra-red communication connection, or other type of wireless communication.

In embodiments of the present invention, accurate presentation of the true colors to an observer is as important as capturing the true colors of subject 211. Thus, embodiments of the present invention may be used to adjust a display so that the colors shown by the display are as desired. In other words, eliminating chromatic distortion created by a display device is also important in conveying the true color of a subject. In embodiments of the present invention, the data accessed by the display may be described as "raw" data that has not yet been processed as described above with reference to FIG. 2A. In another embodiment, the data accessed by the display may be described as "processed" data that has been processed as described above with reference to FIG. 2A.

Furthermore, it is noted that embodiments of the present invention are not limited to color correction alone. For example, in embodiments of the present invention, color correction component 204 may also examine imaged reference color set 202 for a geometric pattern to determine if the lens of image capture device 201 is introducing geometric flaws into image 206. If a geometric flaw is detected in image 206, color correction function may also comprise a transform function for correcting this flaw in modified image 207.

Figure 2B:
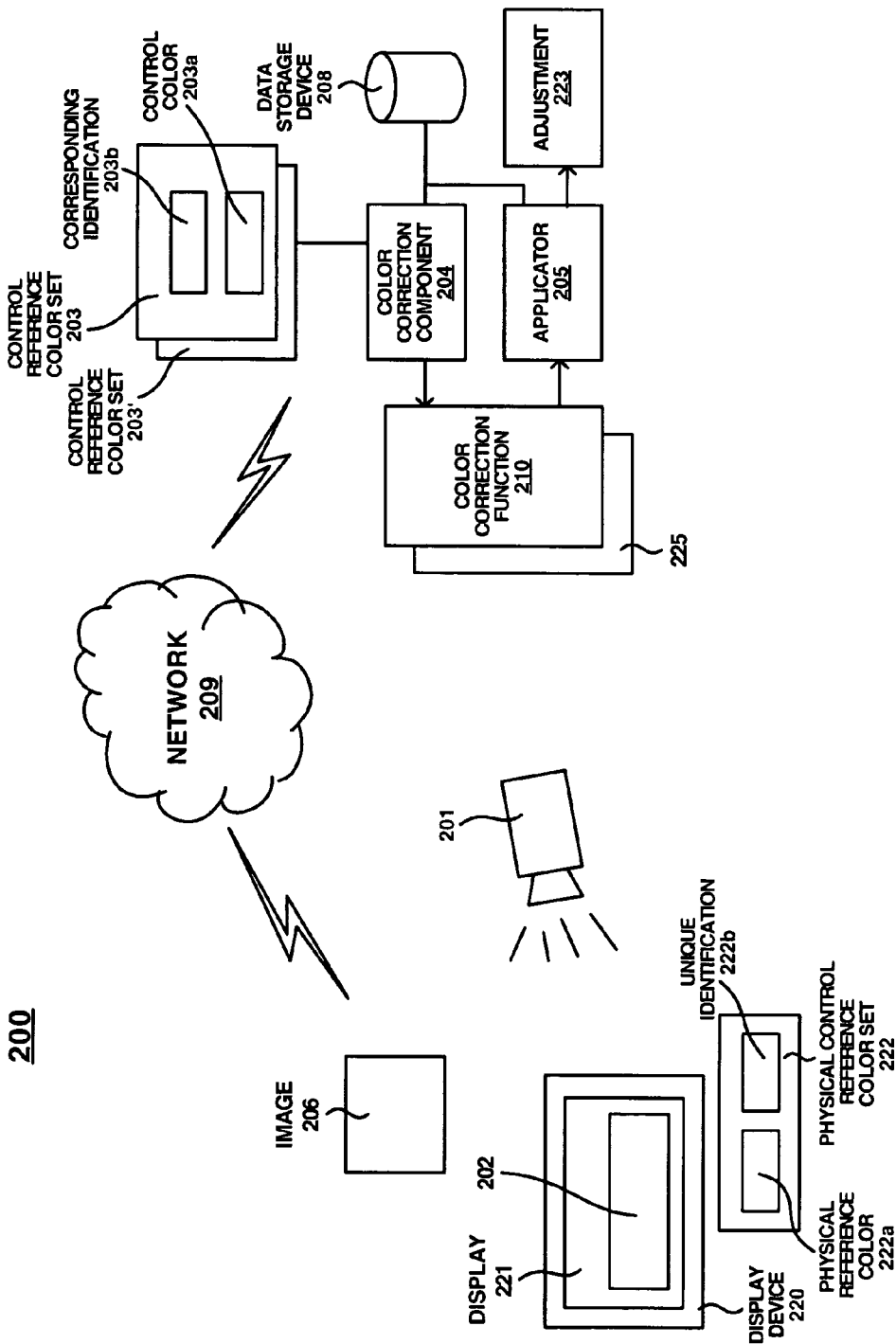

FIG. 2B shows another exemplary image capture system used in accordance with embodiments of the present invention. In the embodiment of FIG. 2B, the data accessed by the display device can be described as "processed" data that has been processed as described above with reference to FIG. 2A to represent "true" color. In FIG. 2B, a display device 220 generates a display 221. In embodiments of the present invention, display 221 may comprise a printed display, a projected display, a digitally generated display, or the like. In FIG. 2B, imaged reference color set 202 is shown in display 221 and a physical control reference color set 222 is disposed proximate thereto. It is noted that imaged reference color set 202 may comprise reference color 202a and unique identification 202b as described above with reference to FIG. 2A. Similarly, physical control reference color set 222 may further comprise a physical reference color 222a and corresponding identification 222b. It is noted that the spectral reflectance and color signal values of physical reference color 222a may correspond with the spectral reflectance and color signal values of control reference color set 203 as described above with reference to FIG. 2A.

In embodiments of the present invention, the ambient lighting conditions and image processing parameters of image capture device 201 may be determined first prior to processing the imaged reference color set 202 shown in display 221. Thus, in one embodiment, color correction component 204 compares physical reference color 222a with control color 203a to determine how the colors of imaged reference color set 202 have been transformed due to the ambient lighting conditions and the image processing parameters of image capture device 201. Color correction component 204 can then determine what adjustments are necessary so that the received spectral reflectance and color signal values of physical control reference color set 222 correspond with the known spectral reflectance and color signal values of the control reference color set 203. Color correction component 204 then generates color correction function 210 which compensates for distortions of the image induced by the ambient lighting conditions or the image processing parameters of image capture device 201 when capturing the image of physical control reference color set 222.

As shown in FIG. 2B, imaged reference color set 202 and physical control reference color set 222 are then simultaneously imaged by image capture device 201. In embodiments of the present invention, image 202 is a "true" color depiction of a provided control reference color set 203', and captured image 206 is conveyed to color correction component 204 where a color correction function is generated based upon a comparison of imaged reference color set 202 and control reference color set 203'. Thus, when a discrepancy between imaged reference color set 202 and control reference color set 203' is detected by color correction component 204, a second color correction function 225 is generated which eliminates the discrepancy between imaged reference color set 202 and control reference color set 203'. As will be described in greater detail below, in embodiments of the present invention, color correction component 204, or applicator 205 may comprise a color adjustment generator for controlling at least one color control of display 221. Thus, in the embodiment of FIG. 2B, applicator 205 may generate an adjustment 223 in response to second color correction function 225 which causes a change in one of the color controls of display 221 which eliminates any discrepancy between the reference color(s) of imaged reference color set 202 and control reference color set 203'.

In other words embodiments of the present invention determine a first transform function (e.g., color correction function 210) between physical control reference color set 222 and its correct photometric appearance for viewing. A second transform function (e.g., second color correction function 225) between control reference color set 203' and imaged reference color set 202 is determined. The mapping from the display to the correct viewing in an image can be determined from an appropriate combination of these two transforms. Color correction function 210 accounts for the combined effects of illumination and image capture parameters on the observed colors of physical control reference color set 222. Second color correction function 225 accounts for the combined effects of illumination, display parameters of display device 220, and image capture parameters. Thus, an inverse product process of color correction function 210 with second color correction function 225 can be made to determine the effects of the display parameters of display device 220. As a result, the output of display device 220 can then be controlled by system 200 such that the ambient lighting conditions at display device 220 as well the display processing parameters of display device 220 do not affect the representation of colors in display 221. In other words, the image displayed by display device 220 is now independent of the ambient lighting conditions and the image processing capabilities of the camera which captures the image and the true colors of a subject can be accurately conveyed by system 200. It should also be noted that control reference color set 203' as applied to the displayed image 202 need not differ from the reference set 203 as applied to physical control reference color set 222. They will be the same if the data accessed by the display device 220 is the same as the color depiction of the physical control reference color set 222 (i.e., processed to be 203).

It is noted that the configuration of system 200 in FIG. 2B is exemplary and that other configurations of the components are possible in accordance with embodiments of the present invention. As described above, color correction component 204, applicator 205, and data storage device 208 may be implemented as a discrete color correction system, or as a network of communicatively coupled components. In embodiments of the present invention, functions of color correction component 204, applicator 205, and data storage device 208 may be performed as a service by a third party service provider, or the provider of network 209. Alternatively, color correction component 204, applicator 205, and data storage device 208 may be implemented as components of image capture device 201 or display device 220. It is noted that this process may occur once as a calibration step of display device 220, as an iterative or feedback cycle for constantly adjusting the color control of display device 220, or as an adjustment to the accessed color representation of image 202 such that the resulting display of 202 in 221 is within acceptable tolerance of the "true" control reference color set 203'.

Figure 2C:
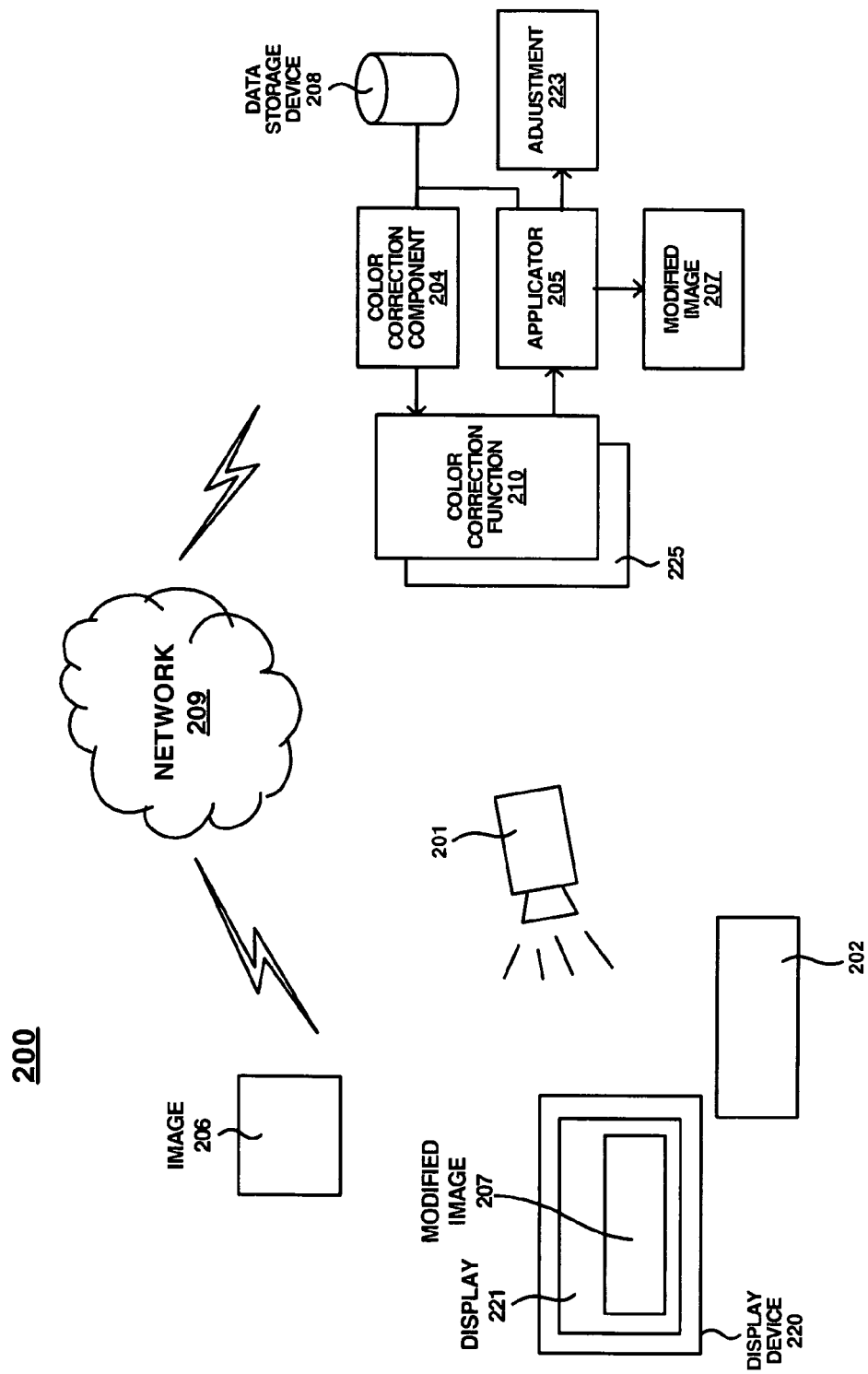

Referring now to FIG. 2C, the data (e.g., modified image 207) accessed by display device 220 can be described as "synthesized" data that has been generated to conform with the control color reference set 203 to match the "true" color of physical control reference color set 202. As shown in FIG. 2C, modified image 207 and imaged reference color set 202 are simultaneously imaged by image capture device 201. In embodiments of the present invention, this image 206 is conveyed to color correction component 204 where a color correction function is generated based upon a comparison of the two reference color sets visible in modified image 207—the displayed image 207 and reference color set 202. Thus, when a discrepancy between modified image 207 and reference color set 202 is detected by color correction component 204, a color correction function 225 is generated which eliminates the discrepancy between modified image 207 and reference color set 202. As will be described in greater detail below, in embodiments of the present invention, color correction component 204, or applicator 205 may comprise a color adjustment generator for controlling at least one color control of display 221. Thus, in the embodiment of FIG. 2C, applicator 205 may generate an adjustment 223 in response to second color correction function 225 which causes a change in one of the color controls of display 221 which eliminates any discrepancy between the reference color(s) of modified image 207 and reference color set 202.

Because modified image 207 should represent the "true" color values of control reference color set 202, any discrepancy between them is indicative of distortions in the colors shown in display 221. Thus, in embodiments of the present invention, modified image 207, when shown in display 221, may be used as a reference color set for determining color correction 225. A transform function (e.g., color correction function 225) between imaged reference color set 202 and displayed image reference color set 207 is determined. Any discrepancies between these color values will indicate the distortions in color representation due to characteristics of the display device 220. As a result, the output of display device 220 can then be controlled by system 200 such that the display processing parameters of display device 220 do not present deviation from the colors of reference color set 202 in the representation of colors in display 221. In other words, the image displayed by display device 220 is now consistent with the desired "true" color set 202. How truly consistent the display is will depend upon the gamut of the display device, in other words, its ability to accurately render the desired colors.

It is again noted that the configuration of system 200 in FIG. 2C is exemplary and that other configurations of the components are possible in accordance with embodiments of the present invention. As described above, color correction component 204, applicator 205, and data storage device 208 may be implemented as a discrete color correction system, or as a network of communicatively coupled components. In embodiments of the present invention, functions of color correction component 204, applicator 205, and data storage device 208 may be performed as a service by a third party service provider, or the provider of network 209. Alternatively, color correction component 204, applicator 205, and data storage device 208 may be implemented as components of image capture device 201 or display device 220. It is noted that this process may occur once as a calibration step of display device 220, as an iterative or feedback cycle for constantly adjusting the color control of display device 220, or as an adjustment to the accessed color representation of image 207 such that the resulting display of 207 in 221 is within acceptable tolerance of the "true" color set 202.

In the embodiments of the present invention described in FIGS. 2A, 2B, and 2C, feedback from the analysis of image 206 may be used to adjust internal sensor and actuator settings. This enables, for example, image capture device 201 to optimize its register settings (e.g., gain, exposure, brightness, black and dark level, saturation, contrast, etc.) so that the resulting capture of images best represents the true color values. Similarly, the controls of display device 220 can be adjusted to optimize its output of display 221, or the colors presented could be transformed to yield their best display given the system's effects.

Figure 3:
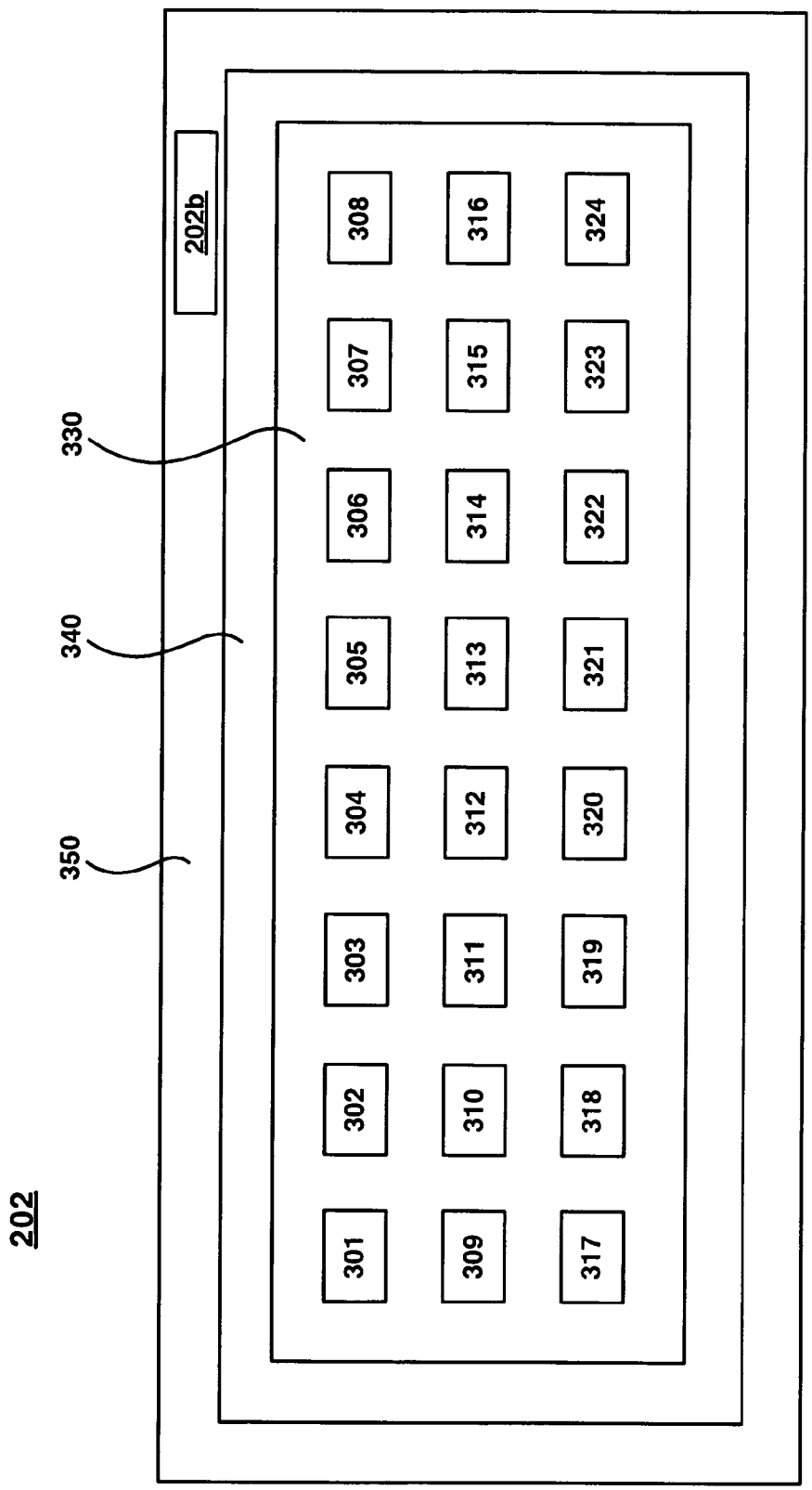
FIG. 3 shows an exemplary color reference set used in embodiments of the present invention.

FIG. 3 shows an exemplary imaged reference color set 202 used in embodiments of the present invention. It is noted that while the following discussion recites regions of imaged reference color set 202 comprising a color or colors, for the sake of clarity, these colors have been omitted from FIG. 3. In embodiments of the present invention, imaged reference color set 202 is designed for robust automatic detection by color correction component 204.

As shown in FIG. 3, imaged reference color set 202 comprises a plurality of color patches (e.g., 301-324) which are arrayed in 3 rows of 8 color patches each. Color patches 301-324 comprise the reference color(s) 202*a* described above with reference to FIGS. 2A, 2B, and 2C. In embodiments of the present invention, color patches 301-324 are set against a black background 330 which is bounded by a white border 340 and a black border 350. In embodiments of the present invention, color correction component 204 uses a detection algorithm to identify a pattern consistent to that produced by bounding black background 330 with white border 340. Black border 350 is used to facilitate identifying white border 340. It is noted that embodiments of the present invention are not limited to this type of pattern alone and that any detectable reference pattern arrangement may be used provided that color correction component 204 can detect the pattern when it is present in image 206. For example, imaged reference color set 202 may comprise a checkerboard pattern, stripes, or background in which the colors represented by color patches 301-324 are embedded into wall paper, wall hangings, rugs, etc. In another embodiment, imaged reference color set 202 may comprise continuous color variations over a desired color range, such as a spectrum or rainbow of colors. Sampling of colors from a continuous range may comprise sampling the entire range of colors, or sampling discreet regions of the continuous range. Additionally, while FIG. 3 shows a rectangular array, color patches 301-324 may be disposed in a circular pattern, a triangular pattern, a square pattern, etc. as well.

In the embodiment of FIG. 3, color patches 301-308 comprise primary and secondary colors for general scene tone balancing and two shades of gray plus black and white for white balancing. Color patches 309-324 comprise sixteen color patches representative of a selected range of colors. For example, in one embodiment, color patches 309-324 comprise a range of human skin colors. In embodiments of the present invention, the color descriptions of control reference color set 203 are known to color correction component 204 and are used as the reference or "true," color space, independent of lighting and image capture device characteristics, to which imaged reference color set 202 is compared. For example, in one embodiment, the spectral reflectances of each color patch (e.g., 301-324) is measured and then approximated as a 3-component standard red, green, blue (sRGB) encoded digital value. These encoded signal values are then compared with the corresponding 3-component signal values of the control colors (e.g., 203*a*) of control reference color set 203.

As shown in FIG. 3 imaged reference color set 202 comprises a unique identification 202*b*. In embodiments of the present invention, unique identification 202*b* may comprise any symbol, letter, word, pattern, number, barcode, radio frequency identification (RFID) tag, etc. that is recognizable to image capture device 201.

By uniquely identifying a reference color set, embodiments of the present invention facilitate identifying the control reference color set 203 whose color characteristics correspond with the color patches 301-324. This is advantageous remotely accessing (e.g., by image capture device 201) the control reference color data that corresponds with imaged reference color set 202. Thus, if image capture device 201, or display device 220, comprises a color correction component 204, the control reference color set 203 that corresponds with imaged reference color set 202 can be identified, using corresponding identification 203*b*, and downloaded. Similarly, a carrier or service provider can quickly identify the color characteristics that correspond with a particular imaged reference color set 202.

Figure 4:
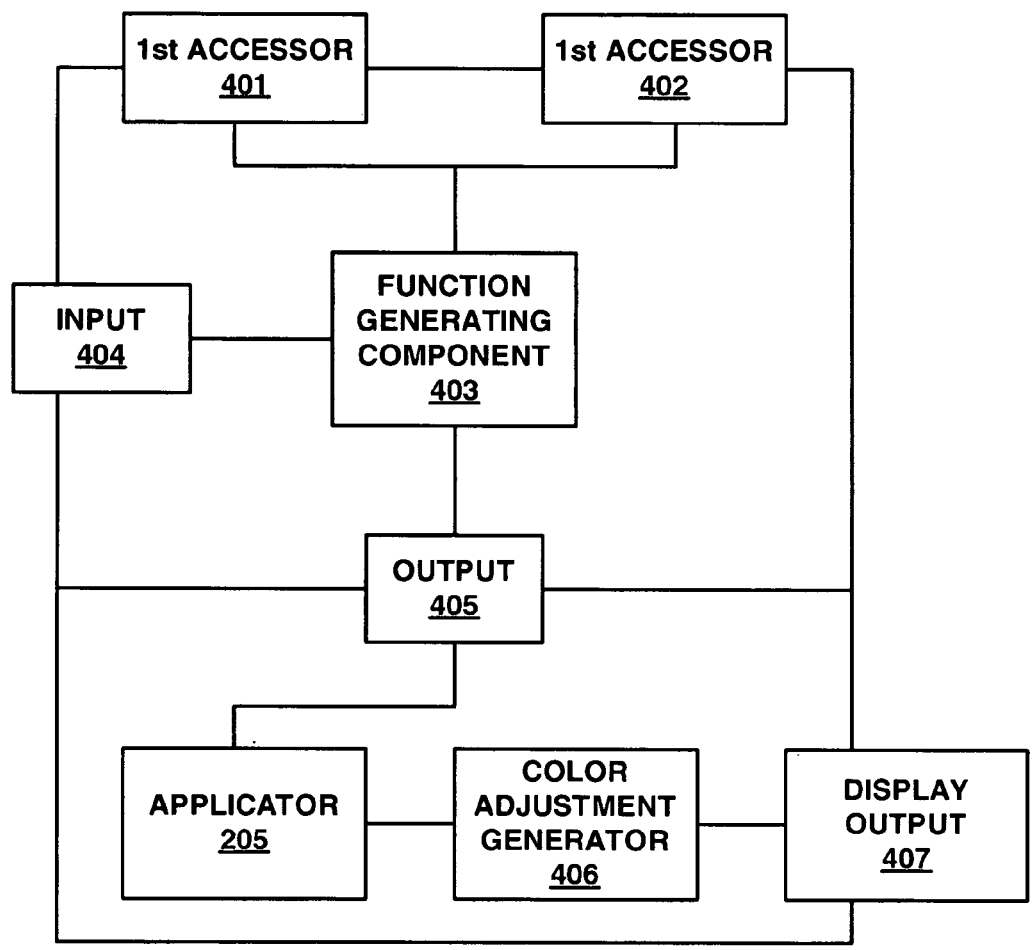
FIG. 4 is a block diagram of a color correction component in accordance with embodiments of the present invention.

FIG. 4 is a block diagram of a color correction system 400 for providing true color correction in accordance with embodiments of the present invention. In embodiments of the present invention, color correction component 204 comprises a first accessor 401 for accessing an imaged reference color set and a second accessor 402 for accessing a control reference color set 203. It is appreciated that in embodiments of the present invention, a single accessor may be operable for accessing both color correction component 204 and control reference color set 203. In the embodiment of FIG. 4, color correction system 400 further comprises a function generating component 403 coupled with first accessor 401 and second accessor 402 for generating a color correction function (e.g., 210). In embodiments of the present invention, first accessor 401, second accessor 402, input 404, output 405, and function generating component 403 may perform the functionality of color correction component 204 described above with reference to FIGS. 2A, 2B, and 2C. In the embodiment of FIG. 4, system 400 further comprises applicator 205 for applying color correction function 210 to an image and a data storage device 208 for storing data. It is noted that in embodiments of the present invention, applicator 205 may output modified color values of the pixels of image 206 rather than a modified image as described above. In the embodiment of FIG. 4, system 400 further comprises a color adjustment generator 406 for generating an adjustment to at least one color control of a display device, and a display output 407 that is coupled with color adjustment generator 406 and a display device (e.g. 220 of FIGS. 2B and 2C).

In embodiments of the present invention, color correction component 204 performs an automatic detection of a target pattern (e.g., imaged reference color set 202). In an exemplary target detection sequence, a monochrome (e.g., a luminance only) version of the color image is filtered using, for example, a Laplacian filter. This determines the locus of maximal brightness change in the image (e.g., between the color patches 301-324 and background 330, or between white border 340 and black border 350). The locus of zero-crossing positions observed in the Laplacian output are then connected, where possible, into a set of closed contours. Each of the closed contours is then approximated by a sequence of linear segments, which may be determined through a successive bisection operation based on deviation of the contour from a straight line. "Rectangle candidates" are accepted for those contours whose segmentation (as above) results in four major pieces whose relationships are consistent with the projection of a planar rectangle (i.e., opposing sides are consistent with being parallel and adjacent sides are consistent with being orthogonal) In one embodiment, a contour "rectangle candidate" is located whose contrast is indicative of a darker exterior (e.g., black border 350) and lighter interior (e.g., white border 340). Then, a contour "rectangle candidate" is located inside the above contour whose contrast is indicative of a lighter exterior (e.g., white border 340) and a darker interior (e.g., black background 330).

In embodiments of the present invention, it is then determined if the above contour (e.g., the edge of black background 330) contains a set of "rectangle candidate" contours (e.g., color patches 301-324) whose contrasts are indicative of lighter interiors set inside a darker exterior. For example, each of color patches 301-324 are lighter than the black background 330 in which they are positioned. A determination is made of the transformation that maps the outer two "rectangle candidate" contours (e.g., black border 350 and white border 340) to true rectangles of correct aspect and relationship based upon the known values of these contours from the reference target description. In the present embodiment, it is then determined whether the interior contours (e.g., of color patches 301-324) are also of the correct aspect ratio and at consistent locations when transformed by the above transformation (based upon the known values of the contours of the color patches). It is noted that some of the color patches may have contrast values that inhibit their detection in a given image 202. However, in embodiments of the present invention, if a sufficient number of interior color patches are detected (e.g., a suitable measure of "sufficiency" might be 90%), then the reference target is accepted as being detected. In embodiments of the present invention, the color values inside the above-detected and validated color patches are sampled and used as the sample values for establishing the true-color transformation performed by color correction component 204. Because the orientation of imaged reference color set 202 may be ambiguous in some situations when strictly using the geometry rectangle measures, orientation of imaged reference color set 202 may be determined by assessing the arrangement of the color patches 301-324 themselves. In other embodiments, distinctive markings (e.g., a geometric pattern, or a geometric pattern of color patches 301-324) may reveal the orientation of imaged reference color set 202 through their shape or relationships.

In embodiments of the present invention, color correction component 204 may also validate the imaged reference color set 202 upon detection to ensure the fidelity of color patches 301-324 in imaged reference color set 202. For example, if color patches 301-324 fade, or become discolored due to staining, the results of sampling the color patches by color correction component 204 may become skewed. As a result, an incorrect estimation of the color correction function 210 by color correction component 204 may result. Thus, in embodiments of the present invention, color correction component 204 may validate the age or version of imaged reference color set 202. In another embodiment, unique identification 202*b* may be used to determine when imaged reference color set 202 was created and thus determine whether it is still valid. Alternatively, one or more of the inks used to create imaged reference color set 202 may be selected to fade after a given amount of time. As a result, portions of imaged reference color set 202 may become unrecognizable to color correction component 204 which prevents further estimation of the color correction function from imaged reference color set 202. In another embodiment, fading of one or more of the inks may cause a message to be displayed which tells a user that imaged reference color set 202 has expired and that a new version will be needed.

In embodiments of the present invention, upon determining that the imaged reference color set 202 is a valid copy, color correction component 204 then estimates the color transformation, also referred to as a "transform function", between the color space of imaged reference color set 202 and the control reference color set 203 to determine color correction function 210. In one embodiment of the present invention, a least-squares estimation is used to derive a color correction function F in the form of 3×4 matrix, that maps measured patch mean colors M (e.g., from one or more of color patches 301-324) from imaged reference color set 204 to corresponding control color values R in control reference color set 203. In other embodiments, the measured patch mean color values may be processed through an inverse-gamma function to remove the effects of device non-linear contrast adjustment. The matrix results in a transform function F a 3×3 color transformation matrix plus an additive per-color-component offset. In embodiments of the present invention, prior to performing the least-squares estimation, patch mean colors with at least one saturated component are excluded, and the sRGB color component function is inverted for both M and R. In other embodiments, the measured patch mean color values may be processed through an inverse-gamma function to remove the effects of device non-linear contrast adjustment. However, while a 3×4 matrix may be used to determine the color correction function, embodiments of the present invention are not limited to linear algebra to determine this function. In other words, the color correction function 210 can take any functional form.

In embodiments of the present invention, all of the color patches from imaged reference color set 202 may be measured and used to determine the color correction function 210). In another embodiment, the color patches may be selectively sampled. For example, in one embodiment, only the color patches (e.g., 301-308) of the primary, secondary, and monochrome colors (e.g., blue, green, red, cyan, magenta, yellow, and gray shades) are used to determine color correction function 210. Embodiments of the present invention may also sample white tones from white border 340 and black tones from background 330 or black border 350. In another embodiment, all of the color patches (e.g., color patches 309-324) as well as black, white, and gray tones are sampled in order to determine color correction function 210. In another embodiment, only the color patches (e.g., color patches 309-324) are sampled to determine color correction function 210. In embodiments of the present invention, it may be advantageous to provide an imaged reference color set 202 in which color patches 309-324 are closely matched to the coloration of subject 211. For example, if subject 211 is a red car, it may be advantageous to select an imaged reference color set 202 in which color patches 309-324 are primarily red tones. In such an embodiment, it may be advantageous to only sample color patches 309-324 in order to determine a color correction function best suited for estimating the color of. subject 211. For example, sampling all of the imaged color patches from the imaged reference color set 202 may result in a color correction function 210 that is best suited for correcting the colors of the overall image, but is not necessarily best suited for correcting the imaged color of subject 211. Thus, dense sampling of the color region of interest (e.g., the red tones of the car) may be more important than a broad sampling of the overall color space when estimating a color correction function suitable for use in estimating the color of subject 211.

Thus, color correction component 204 determines a color correction function 210 which substantially eliminates discrepancies between the imaged reference color set 202 and the control reference color set 203. If we denote color correction function 210, in any functional form, as F, then this can be expressed by the equation:

$$I\_R = F(I\_C)$$

where I_R is a color in control reference color set 203 and I_C is a corresponding color from imaged reference color set 202. When applied to image 206, color correction function 210 attempts to accurately convey the colors of image 206 by compensating for the effects of the ambient lighting conditions and of image capture device 201. It is noted that color correction 210 may only be approximate. For example, the color correction function F may not map each acquired image color from imaged reference color set 202 to its exact corresponding reference color in control reference color set 203. Furthermore, it is appreciated that F may lack the degree of precision necessary to cause an exact match to a reference color in control reference color set 203 when applied to the corresponding color in imaged reference color set 202. For the purposes of the present invention, the phrase "substantially eliminates" means that, after F has been applied to the color value 412 of the identified skin pixels of image 206 (e.g., or color descriptions thereof), the difference between the color of subject 211 and the corrected color of subject 211 represented by modified image 207 is not readily discernable, or is within an acceptance parameter.

Figure 5:
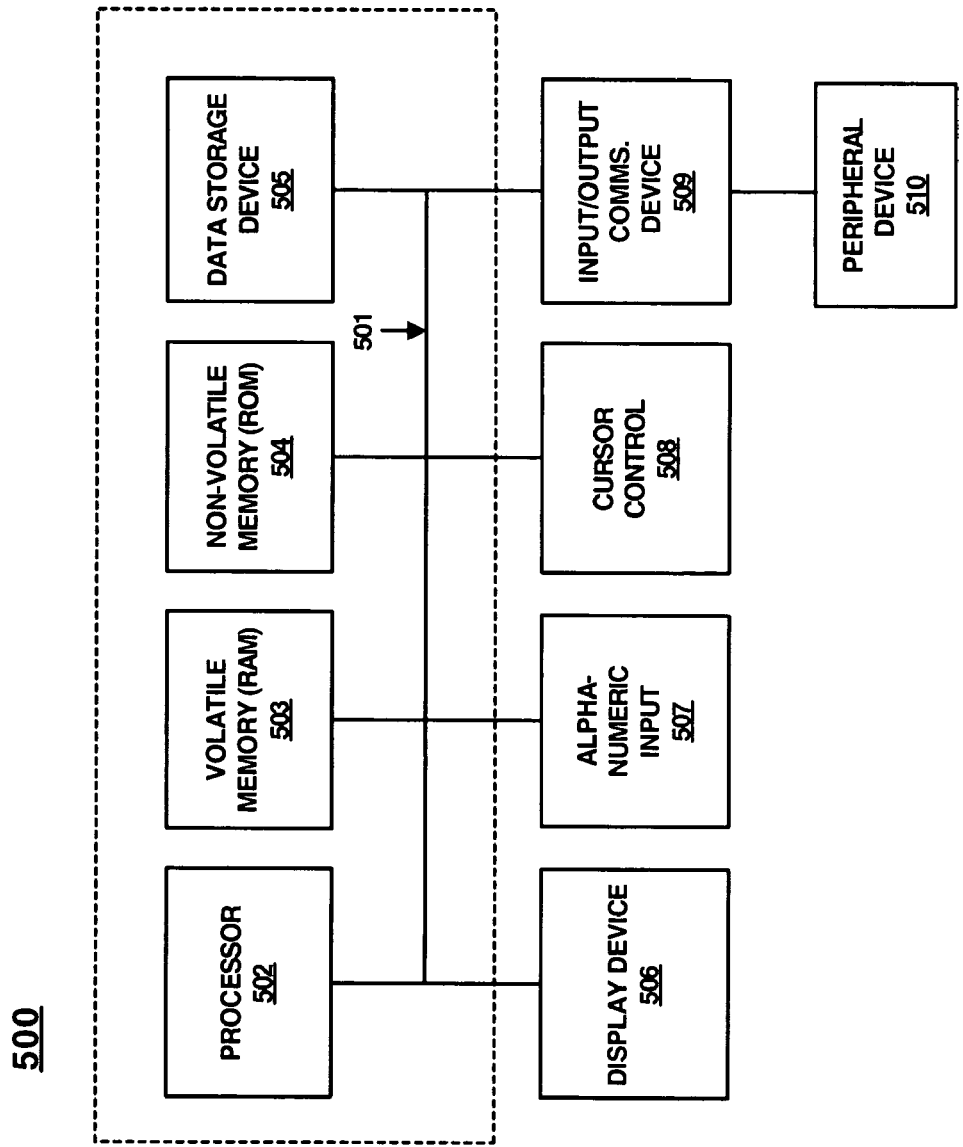
FIG. 5 is a block diagram of an exemplary computer system upon which embodiments of the present invention may be implemented.

FIG. 5 is a block diagram of an exemplary computer system 500 upon which embodiments of the present invention may be implemented. In embodiments of the present invention, portions of the present invention are comprised of computer-readable and computer-executable instructions that reside, for example, in computer system 500 which is used as a part of a general purpose computer network (not shown). It is appreciated that computer system 500 of FIG. 5 is exemplary only and that the present invention can operate within a number of different computer systems including general-purpose computer systems, embedded computer systems, laptop computer systems, hand-held computer systems, networked computer systems, and stand-alone computer systems.

In the present embodiment, computer system 500 includes an address/data bus 501 for conveying digital information between the various components, a central processor unit (CPU) 502 for processing the digital information and instructions, a volatile main memory 503 comprised of volatile random access memory (RAM) for storing the digital information and instructions, and a non-volatile read only memory (ROM) 504 for storing information and instructions of a more permanent nature. In addition, computer system 500 may also include a data storage device 505 (e.g., a magnetic, optical, floppy, or tape drive or the like) for storing vast amounts of data. It should be noted that the software program for performing skin color estimation of the present invention can be stored either in volatile memory 503, data storage device 505, or in an external storage device (not shown).

Devices which are optionally coupled to computer system 500 include a display device 506 for displaying information to a computer user, an alpha-numeric input device 507 (e.g., a keyboard), and a cursor control device 508 (e.g., mouse, trackball, light pen, etc.) for inputting data, selections, updates, etc. Computer system 500 can also include a mechanism for emitting an audible signal (not shown).

Returning still to FIG. 5, optional display device 506 of FIG. 5 may be a liquid crystal device, cathode ray tube, or other display device suitable for creating graphic images and alpha-numeric characters recognizable to a user. Optional cursor control device 508 allows the computer user to dynamically signal the two dimensional movement of a visible symbol (cursor) on a display screen of display device 506. Many implementations of cursor control device 508 are known in the art including a trackball, mouse, touch pad, joystick, or special keys on alpha-numeric input 507 capable of signaling movement of a given direction or manner displacement. Alternatively, it will be appreciated that a cursor can be directed and activated via input from alpha-numeric input 507 using special keys and key sequence commands. Alternatively, the cursor may be directed and activated via input from a number of specially adapted cursor directing devices.

Furthermore, computer system 500 can include an input/output (I/O) signal unit (e.g., interface) 509 for interfacing with a peripheral device 510 (e.g., a computer network, modem, mass storage device, etc.). Accordingly, computer system 500 may be coupled in a network, such as a client/server environment, whereby a number of clients (e.g., personal computers, workstations, portable computers, minicomputers, terminals, etc.) are used to run processes for performing desired tasks. In particular, computer system 500 can be coupled in a system for estimating skin color from a single captured image.

What is claimed is:

1. An image capture system for conveying a true color of a subject, said system comprising:
    an image capture device;
    an imaged reference color set comprising at least one reference color;
    a control reference color set comprising at least one control color corresponding to said at least one reference color; and
    a color correction component for accessing said control reference color set and said imaged reference color set and for generating a color correction function which eliminates a discrepancy between said at least one reference color and said at least one control color.

2. The image capture system of claim 1 further comprising an applicator for applying said color correction function to an image to create a modified image.

3. The image capture system of claim 2 wherein said applicator comprises a component of said image capture device and said color correction component is communicatively coupled with said image capture device.

4. The image capture system of claim 2 wherein said applicator and said color correction component comprise components of said image capture device.

5. The image capture system of claim 1 wherein said imaged reference color set further comprises a unique identification and wherein said control reference color set corresponds with said imaged reference color set uniquely identified by said unique identification.

6. The image capture system of claim 1 further comprising a data storage device for storing said color correction function.

7. The image capture system of claim 1 further comprising;
    a display device for generating a display selected from the group consisting essentially of a projected display, a printed display, and a digitally generated display.

8. The image capture system of claim 7 wherein said color correction component generates an adjustment to at least one color control of said display device.

9. The image capture system of claim 8 wherein said image capture device captures an image of a physical control reference color set which is disposed proximate to said display and wherein said display comprises said imaged reference color set.

10. The image capture system of claim 8 wherein said display conveys a modified image to which said color correction function has been applied.

11. A method for conveying a true color of a subject, said method comprising:
    using a color correction component for:
    accessing an imaged reference color set comprising at least one reference color;
    accessing a control reference color set comprising at least one control color corresponding to said at least one reference color; and
    generating a color correction function and wherein said color correction function eliminates a discrepancy between said at least one reference color and said at least one control color.

12. The method as recited in claim 11 further comprising:
    applying said color correction function to an image to create a modified image.

13. The method as recited in claim 12 further comprising:
    communicatively coupling said color correction component with an image capture device which applies said color correction function to an image to create said modified image.

14. The method as recited in claim 12 further comprising:
    using an image capture device to perform said generating and said applying.

15. The method as recited in claim 11 further comprising:
    uniquely identifying said imaged reference color set; and
    accessing said control reference color set which corresponds with said uniquely identified imaged reference color set.

16. The method as recited in claim 11 further comprising:
    storing said color correction function in a data storage device.

17. The method as recited in claim 11 further comprising:
    generating a display selected from the group consisting essentially of a projected display, a printed display, and a digitally generated display.

18. The method as recited in claim 17 further comprising:
    generating an adjustment by said color correction component to at least one color control of said display device.

19. The method as recited in claim 18 wherein said display comprises said imaged reference color set and wherein said method further comprises:
    capturing an image of a physical control reference color set which is disposed proximate to said display.

20. The method as recited in claim 18 wherein method further comprises:
    applying said color correction function to an image to create a modified image; and
    conveying said modified image on said display.

21. A computer-usable medium having computer-readable program code embodied therein for causing a computer system to perform a method for conveying a true color of a subject, said method comprising:
    using a color correction component for:
    accessing an imaged reference color set comprising at least one reference color;
    accessing a control reference color set comprising at least one control color corresponding to said at least one reference color; and
    generating a color correction function and wherein said color correction function eliminates a discrepancy between said at least one reference color and said at least one control color.

22. The computer-usable medium of claim 21 wherein method further comprises:
    applying said color correction function to an image to create a modified image.

23. The computer-usable medium of claim 22 wherein method further comprises:
    communicatively coupling said color correction component with an image capture device which applies said color correction function to an image to create said modified image.

24. The computer-usable medium of claim 22 wherein method further comprises:

using an image capture device to perform said generating and said applying.

25. The computer-usable medium of claim 21 wherein method further comprises:
uniquely identifying said imaged reference color set; and
accessing said control reference color set which corresponds with said uniquely identified imaged reference color set.

26. The computer-usable medium of claim 21 wherein method further comprises:
storing said color correction function in a data storage device.

27. The computer-usable medium of claim 21 wherein method further comprises:
generating a display selected from the group consisting essentially of a projected display, a printed display, and a digitally generated display.

28. The computer-usable medium of claim 27 wherein method further comprises:
generating an adjustment by said color correction component to at least one color control of said display device.

29. The computer-usable medium of claim 28 wherein said display comprises said imaged reference color set and wherein said method further comprises:
capturing an image of a physical control reference color set which is disposed proximate to said display.

30. The computer-usable medium of claim 28 wherein method further comprises:
applying said color correction function to an image to create a modified image; and
conveying said modified image on said display.

* * * * *